United States Patent
Fisher et al.

(10) Patent No.: US 7,284,149 B1
(45) Date of Patent: Oct. 16, 2007

(54) INTERMITTENT CONNECTION PROTECTION FOR EXTERNAL COMPUTER DEVICES

(76) Inventors: Ken Scott Fisher, 5521 Cleon Ave., North Hollywood, CA (US) 91601; Kevin Cotton Baxter, 5521 Cleon Ave., North Hollywood, CA (US) 91601

( * ) Notice: Subject to any disclaimer, the term of this patent is extended or adjusted under 35 U.S.C. 154(b) by 482 days.

(21) Appl. No.: 10/065,421

(22) Filed: Oct. 16, 2002

(51) Int. Cl.
  *G06F 11/00* (2006.01)
(52) U.S. Cl. .............................. 714/5; 714/43; 714/44; 711/115
(58) Field of Classification Search ................ 714/5, 714/24, 43, 44; 711/162, 115; 365/226, 365/228; 463/43
See application file for complete search history.

(56) References Cited

U.S. PATENT DOCUMENTS

| | | | | |
|---|---|---|---|---|
| 5,438,549 | A * | 8/1995 | Levy .......................... | 365/229 |
| 5,608,684 | A * | 3/1997 | Reasoner et al. ........... | 365/228 |
| 6,101,076 | A | 8/2000 | Tsai et al. | |
| 6,181,630 | B1 * | 1/2001 | Caulkins ..................... | 365/228 |
| 6,243,831 | B1 | 6/2001 | Mustafa et al. | |
| 6,389,560 | B1 | 5/2002 | Chew | |
| 6,415,342 | B1 | 7/2002 | Wahl et al. | |
| 6,594,727 | B1 * | 7/2003 | Tanaka ........................ | 711/115 |
| 6,614,708 | B1 * | 9/2003 | Lin et al. ..................... | 365/228 |
| 6,643,731 | B2 * | 11/2003 | Lu et al. ...................... | 711/103 |
| 6,694,451 | B2 * | 2/2004 | Atkinson ....................... | 714/15 |
| 6,711,663 | B2 * | 3/2004 | Lai et al. ..................... | 711/206 |
| 6,792,501 | B2 * | 9/2004 | Chen et al. ................. | 711/103 |
| 6,829,672 | B1 * | 12/2004 | Deng et al. ................. | 711/103 |
| 6,871,271 | B2 * | 3/2005 | Ohran et al. ................ | 711/162 |
| 2002/0089307 | A1 | 7/2002 | Yang | |
| 2004/0010656 | A1 * | 1/2004 | Chiao et al. ................ | 711/103 |

\* cited by examiner

*Primary Examiner*—Robert Beausoliel
*Assistant Examiner*—Philip Guyton

(57) ABSTRACT

An integrated computer management and storage system comprising, in a preferred embodiment: an external mass storage device for a host computer; including a power storage sub-system, in the form of a capacitor or battery, such that during an intermittent communication breakdown, it has energy to sustain the static RAM values stored in the registers of the mass storage device for a sufficient period of time, thereby allowing for the option of reconnection, without re-initialization; and an associated mass storage device driver, typically residing on the host computer, capable of re-polling and restoring the connection without re-initialization. Optionally, a redundant backup of the static RAM values may also be stored on the host computer device.

9 Claims, 1 Drawing Sheet

INTERMITTENT CONNECTION PROTECTION FOR EXTERNAL COMPUTER DEVICES

BACKGROUND OF INVENTION

The present invention pertains generally to external computer devices, including, for example, a method for quickly recovering from an intermittent USB connection failure.

The following patents and patent application address various aspects of related prior art systems, all of which are hereby incorporated herein by reference, in their entirety. Their overview is as follows:

U.S. Pat. No. 6,101,076 Tsai, et al. "Electromagnetic safety enhancement circuit for universal serial bus systems" discloses a system which can "simulate" an unplugging action and replugging action of a USB device, so as to re-initialize the USB device to recover from a fault due to electromagnetic interference.

U.S. Pat. No. 6,415,342 Wahl, et al. "Universal serial bus controlled connect and disconnect", discloses a second method to re-initialize a USB device without physically removing or reinserting the USB device/cable.

U.S. Pat. No. 6,243,831 Mustafa, et al. "Computer system with power loss protection mechanism". Discloses a backup system, wherein when a computer is in a reduced power state, or sleep mode, the operating system directs device drivers to save the state of hardware registers to RAM (e.g., change to hibernation state) in the event of loss of main system power.

United States Patent Application 20020089307 Yang, "Electric appliance equipped with redundant battery enabled by mains power supply", proposes a second or "redundant" battery which is to be enabled by a mains power supply.

U.S. Pat. No. 6,389,560 Chew, "Universal serial bus interpreter", discloses a system and method for testing the conformance of a universal serial bus (USB) system to a set of predefined USB Specifications. One embodiment of the system comprises a USB interpreter that can be used to selectively examine device data, execute USB commands and exercise USB functions without having to create or compile a test program. The USB interpreter comprises a test application and a test application driver.

From an overview standpoint, the world is quickly moving towards truly "standardized" interfaces (e.g., USB 1.1, 2.0, Firewire), which are available now on many systems and platforms (e.g., Apple™, PC compatible, etc.). These new unified standards are providing considerably more options to system designers and computer programmers to design more workable "plug and play" external computer devices. USB, of course, is well known in the art, and today USB is enjoying tremendous success in the marketplace, with most peripheral vendors around the globe developing products to this specification. Virtually all-new personal computers come with one or more USB ports on the box. In fact, USB has become a key enabler of the Easy PC Initiative, an industry initiative led by Intel™ and Microsoft™ to make PCs easier to use. This effort sprung from the recognition that users need simpler, easier to use PCs that don't sacrifice connectivity or expandability. USB is one of the key technologies used to provide this. The invention as will be described herein aims to further extend this easier to use, increased connectivity, technology.

The expanding use of multiple computers, by single individuals has revealed various problems with managing user-data. For example, a user may work on a project on a computer at one location, and then need to take the work data to a second location or computer (e.g., laptop). Recently, a new class of ultra portable drives has been introduced to better address this transfer of data from one computer to another. These new ultra portable devices (e.g., USB mass storage flash drives) are commonly the size of a pack of gum, and have achieved the status of "pocketability" (e.g., easily fits in one's pocket). A device as such, can fit on the end of user's key chain, and can be easily plugged directly into multiple computer systems. This is especially true with Windows™ Millennium edition and higher operating systems, where devices such as USB flash drives can be plugged into a USB port and used in a "plug and play" fashion (without the need for any external drivers, or data/power cables). Earlier operating systems can also benefit by the addition of a once-installed external driver. Such devices are ideally suited for the transportation of information, since they have no moving parts (e.g., more rugged than conventional micro drives), and are usually powered directly from the USB port (no external power or batteries). Although it should be noted that this "ultra" portability does have its own set of drawbacks, as will be outlined below.

While the aforementioned flash drive systems have the ability to deliver low-cost, data transportation to the masses, there are still a number of inherent limitations, which lead to a need for additional data integrity approaches, when operational continuity is required. For example, since USB flash drives have been designed so as to be carried attached to a user's key chain, they are typically connected "directly" into a host computer's USB port (e.g., no cable), and tend to protrude out from the computer itself, and are thereby prone to being "jarred" or bumped, with the resulting potential for inadvertent and intermittent connection breaks. This is especially true since many computer manufacturers now have USB ports on the front of the computer case, or on the keyboard itself. In addition, many off these devices also derive their power directly from the host computer. Such devices must also go through a shut down procedure, prior to being removed from the host computer, which a user may commonly forget to execute. Any of these connection breaks (either full or partial) may result in lost data files, and in the extreme, may also "lock-up" the host computer system itself, requiring a full system re-boot. Although the operating system may notify the user of such a connection failure, even giving a warning of the potential of lost data, there is no effort made to recover "intact" from such a connection break, thereby requiring full re-initialization of the device prior before proceeding. This "halfway", notification only, approach not only affects the system's continuity but also creates much frustration with end-users.

Most external devices such as keyboards, mice, printers, and the like, are now commonly using USB connections. This, combined with the fact that desktops and laptops are also using USB based external mass storage devices, greatly increases the chances of a user experiencing a USB connectivity failure. The more complex external mass storage devices normally contain vital information (e.g., static registers, user data) in which a failure in the link between the memory and the host computer can be catastrophic.

All of this points to lost time and efficiencies, data integrity risks, and the real potential of losing critical data files.

Heretofore, a barrier has essentially existed for users to recover their existing external device settings, such as the static registers, during intermittent connection breaks, and resume working in an "as-is" state. There would be remarkable advantages in efficiencies and ease of use, if the register and configuration data were maintained "as-is" and restored on the external device after a break in connectivity, whether momentary or otherwise.

As a result, a need exists in the art for an improved method and apparatus that provides the user with the ability to better recover from inadvertent connection breaks between a host computer and an external device.

A primary object of the present invention is to provide a new, novel and useful method and apparatus (e.g., a portable mass storage device), which does not require a devices to be re-initialized after an intermittent connection break.

A still further object of the present invention is to provide a method for a redundant means to protect and verify the integrity of critical data stored on an external mass storage device.

A further object of the present invention is to provide an improved method and device as characterized above which by its nature is more transparent in operation to the end user, and thereby enhances the user's ease of use.

SUMMARY OF INVENTION

An integrated computer management and storage system, comprising in a preferred embodiment: an external mass storage device for a host computer; including a power storage sub-system, in the form of a capacitor or battery (e.g., contained within the mass storage device itself), such that during an intermittent communication/connection breakdown, it has energy to sustain the static RAM values stored in the registers of the mass storage device for a sufficient period of time, thereby allowing for the option of reconnection, without re-initialization; and an associated mass storage device driver, typically residing on the host computer, capable of re-polling and restoring the connection without re-initialization. Optionally, a redundant backup of the static RAM values may also be stored on the host computer device.

When there is an inadvertent connection error with the external mass storage device, the user may be prompted (e.g., via the custom device driver) to re-connect the device within the pre-determined period of time, thereby giving the user the ability to continue working, without any loss of user data, and without having to re-initialize the mass storage device. In the event of an intermittent connection break, the innovative system may also automatically re-establish the existing connection, without any required action by the operator, so as to aid in ease of use.

The invention is distinguished over the prior art in a multiplicity of ways. For one thing, the invention automatically retains the values stored in the registers used to control the circuitry associated with operations of an external device (e.g., keyboard, mouse, mass storage device). Equally as important, however, it gives the user a fault correction system, heretofore unavailable, with the opportunity to continue to work even in the event of a complete connection disruption between an external device and the host computer.

In another embodiment, the portable memory device may exclude the battery backup sub-system in the external device, and the innovative driver may simply store a backup of the static registers (e.g., on the host computer), and upon reconnection, the device may be re-initialized and the stored values could then be reloaded onto the device. This software approach recognizes the communication break, polls to see a re-connect, and then automatically re-initializes and re-creates the correct stored register and configuration data. Additionally, it may also notify the user to reconnect the device. By excluding the power sub-system requirement, the inventive system would be backwards compatible to cover existing devices.

In yet another embodiment, the system may be designed to first save data destined for an external mass storage device, to a cache located on the local host machine (e.g., RAM), and subsequently (e.g., in the background) it could then update the local cache data out to the external device. Such an approach would be an extremely valuable addition to the art, and would be especially useful in recovering data, which is corrupted, when a connection loss is experienced during the process of physically writing data to a drive. This innovative approach may be further designed with well-known data integrity verification schemes (e.g., after the data has been written).

It should be noted that many of these embodiments could also be utilized solely within conventional "self-contained" computer system, for an improved data protection system.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF DRAWINGS

The present invention is illustrated by way of example and not by way of limitation in the figures of the accompanying drawings in which references indicate similar elements and in which.

DETAILED DESCRIPTION

Figure 1:
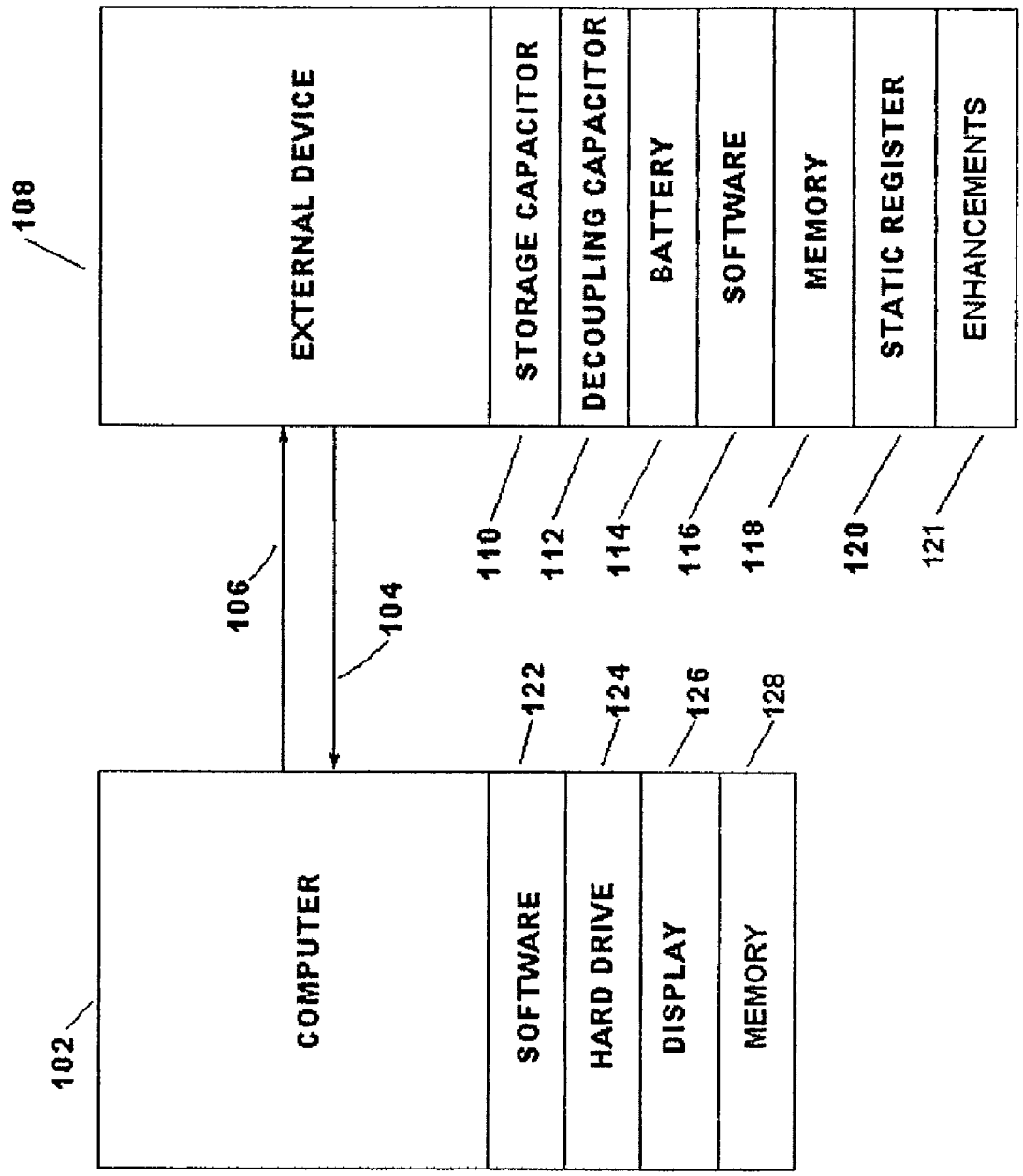
FIG. 1 is a flow chart of the instrumentality and data flow according to the present invention.

Before describing in detail the system in accordance with the present invention, it should be observed that the present invention resides primarily in what is effectively a novel combination of specific data management software and emerging memory circuits and components, and not in the particular detailed configurations thereof. Accordingly, the structure, control and arrangement of the software, circuits and components have been illustrated in the drawings by readily understandable block diagrams which show only those specific details that are pertinent to the present invention, so as not to obscure the disclosure with structural details which will be readily apparent to those skilled in the art, having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

While the preferred embodiment of the inventive device is generally shown and described as being incorporated in a USB flash memory mass storage device, it should be understood that the invention is not so limited and is applicable to most all external computer devices, and, in fact, aspects of the invention are applicable to many types of external computer devices, including USB and Firewire devices, a.k.a IEEE-1394 bus, (e.g., read/write devices, keyboards, mice, etc.), and even to the internal workings of conventional self-contained computer systems.

For the purposes of this invention, the terms "intermittent" and "transient" are used interchangeably. The terms "inadvertent" or "intermittent" or "transient" with respects to a connection error are used herein with reference to a break in connectivity (e.g., power, data communication) between a host computer and an external device. This break may be partial (e.g., one or more of the data or power lines), or complete (e.g., physical removal of the device connector from the host computer).

Referring to FIG. 1, an overview of the system is illustrated in accordance with the present invention. Computer 102 (only one exemplary computer is shown) which may include a connector port (not shown) such as USB or Firewire (or via other communications as stated herein) for communications with the external device 108 (e.g., flash memory drive). In more detail, FIG. 1 also shows the bi-directional data flow to and from, for example, mass storage memory device 108 and computer 102, via communications 104 and 106. Besides USB or Firewire, such communications 104 and 106 may also consist of any industry standard communications means (e.g., direct physical connection, PCMIA, Local Area Network (LAN), a Wide Area Network (WAN), the Internet, a telecommunication network or other connection means. Flash drive 108 may provide storage for user data 118, and may also contain software drivers 116 (e.g., DLL's) and related device management software 116. Inventive device 108 may have a battery 114 and/or energy storage capacitor 110 to bridge intermittent power losses. With respect to power capacitor 110, some prior art systems have included basic capacitors 112 (e.g., decoupling). These existing decoupling capacitors 112 are usually 0.1 or 0.01 microfarads, which smooth out small high-speed spikes and dips, but cannot power device 108 for any usable period of time. The inventive large storage capacitors 110, if used, may be of the "Super Cap™" (e.g., Panasonic T™) variety, which is designed to power devices in much the same manner as a battery. Capacitor 110 is typically of a value several orders the magnitude greater than that of decoupling capacitor 112. Whether batteries 114 and/or capacitors 110 are used, they may be charged automatically by known means in a parasitic manner when the external device 108 is connected to host 102 (e.g., via USB port).

Going into more detail, an intermittent break of any duration whatsoever, in any of the USB wiring connections can cause present USB drivers to terminate the connection with remote device 108 and require the user to re-initialize the external device. Devices 108, which have static RAM or static memory registers 120, are much more affected by such connectivity problems, than other more simplified USB devices (e.g., keyboards). When USB devices lose power, they lose some or all of their configurations. When power is restored they will not work until the host computer re-initializes these registers and/or configurations. This process often requires operators' input or intervention. It is known that some simple devices (e.g., USB keyboards) can be re-polled and can re-establish their connection, unfortunately this typically is not instantaneous (some taking upwards of 30 or more seconds to resume operation).

In the inventive system 108, electrical storage in the form of a capacitor 110 and/or battery 114 has sufficient energy to sustain the value stored in the registers 120 for a period of time. When there is an inadvertent disconnection in the mass storage device (e.g., a break in 104 and/or 106), the operator, through the driver provided to the computer system 102, may be prompted to re-connect within a pre-determined period of time, thereby allowing the operator to continue to work without loss of data and with no requirement to re-initialize device 108. In one embodiment, a window may pop up showing, for example, "USB mass storage device the connection has been broken", on display 126, and then the user may be advised that they have "xx seconds to re-connect". To enable this, a custom mass storage device driver 122 may be required. It may replace the default Windows mass storage driver 122. This replacement may be temporary or permanent. The replacement driver, if used, would recognize the break, and re-establish the connection without the need for re-initialization. By way of non-limiting example, a keyboard using the inventive design could have an added battery 114 and/or energy storage capacitor 110 and may utilize a custom driver in a similar fashion as outlined above.

With respect to the device driver itself, it is now commonplace to have a USB device load its own specific driver 116, which may over-write the existing "resident" driver 122. In the case of the present invention when device 108 is first connected to host computer system 102, the device specific driver, which may be archived on external device 108, or may be unpacked from a cabinet file stored in memory 118 and then transferred for use in host computer 102, and stored in memory 128 (e.g., RAM), or on hard drive 124. Such approaches described herein may be accomplished by one skilled in the art, having the benefit of the disclosure described herein.

As mentioned herein, another embodiment may be designed to first save user data (e.g., 128) destined for external mass storage device 108, to a cache located on the local host machine (e.g., RAM 128 or hard drive 124), and subsequently (e.g., in the background) updated from the local cache data out to the external device memory 118. Such an approach would be an extremely valuable addition to the art, and would be especially useful in recovering data, which is corrupted, when a connection loss is experienced during the physical process of writing data out to drive 108. This innovative approach may be further designed with known data integrity verification schemes (e.g., verify after the data has been written), and may also be designed to act in a fashion similar to well known error correcting "raid" hard drive systems (e.g., Raid 0, Raid 5, and so on). In effect, device 108 could be updated with the changed data, and then different sections of the stored data 116 could be periodically checked (possible more frequently in areas recently changed), so as to verify agreement between the data 118 stored on external mass device 108 and the local cache memory 128 (or located on 124) on machine 102. In addition, when there is an inadvertent disconnection, it is possible that "trash" data may be written to memory 118 of external mass storage device 108. In such a case, upon reconnection of device 108, the data integrity is checked against the cache data on 102 local machine and repaired as needed, thus insuring that device 108 is brought up to the most current state.

In a simple example, a user may save a word processing document, which the inventive system may redirect first to a cache file (e.g., located in RAM 128), and then written (and optionally verified) to the external device 108. Since the systems RAM is typically much faster than a flash memory, the user could return to work much faster. In some ways this could be compared to a printer spool file, with the addition of data-verification and error-correction protocol. If a user attempted to remove the device 108 prior to the full transfer, the user would be provided with warning that the data on the external device is not in sync (not updated), and prompting the user to reconnect, if necessary, so as to complete the transfer.

In another embodiment, portable memory device 108 may not include the energy backup sub-system 110 or 114, in external device 108. In this case, management driver 116 and/or 122 may simply store a backup of static registers 120 (e.g., on host computer 102) and upon reestablishing the connection, management driver 116 may cause device 108 to be re-initialized by known means, and will also initiate the re-mapping process so as to reconstruct the state of device 108 prior to the interruption, including static registers 120. This unique software approach recognizes the communication break, polls to detect a re-connect, and then automatically re-initializes and re-creates the stored register and configuration data. Additionally, it may also notify the user to reconnect device 108. By excluding the power sub-system, the inventive system could be backwards compatible, so as to also cover existing external devices. In some ways the inventive driver software in-fact acts in a fashion similar to the well known "hibernation" feature in operating system, such a program, which on execution typically saves the current state of a computer and then will write stored information along with selected information (e.g., ram, video ram, programs and registry information, preferences, settings, etc.) to a file stored in non-volatile memory. Such features as outlined herein are well known in the art, and their specific integration in the inventive device can be accomplished by one skilled in the art.

In a similar approach, the embodiment with the power backup storage sub-system (with 110 or 114) may also include a backup of static RAM values 120 of device 108 (e.g., stored on the host computer device 102). This redundant feature would avoid a "single-thread" system, thereby allowing for a secondary error-correction approach used in the event of failure in the primary error-correction system.

As mentioned above, short breaks my not bother simple devices such as mouse type pointing devices 108 or keyboards 108. If these simple devices lose their connection, they may simply recycle and start working within a period of time (e.g., 20 seconds). In a more simplified version of the invention, these devices may only have an added energy storage sub-system (e.g., capacitor 110) and optionally, memory 118 and/or 120, so as to immediately return to an active state, upon re-establishing a connection. In such cases, a specific device driver may or may not be required.

Regarding device 108 itself, if it is embodied as a memory device, it may be for example: a memory card; a memory cartridge; a floppy disk; a removable hard disk; a flash memory device; flash drive card; PCMCIA memory card; a micro-drive; or the like.

Regarding computer 102 itself, it may be, for example: a desktop, laptop, or palm top (e.g., PDA) computer; an external storage data device (e.g., backup); or a wireless telephone and/or modem, and other similar devices.

Further enhancements envisioned to the device 108 may include an integrated microprocessor 121, a display 121, a real time clock 121, and a solar cell 121 for providing power to the device.

While the present invention has been described with reference to specific exemplary embodiments, it will be apparent to those skilled in the art that various modifications and changes may be made to these embodiments without departing from the broader spirit and scope of the invention as set forth in the claims. Since modifications of the disclosed embodiments incorporating the spirit and substance of the invention may occur to persons skilled in the art, the invention should be construed to include everything within the scope of the appended claims and equivalents thereof. Accordingly, the specification and drawings are to be regarded in an illustrative rather than restrictive sense.

The invention claimed is:

1. A portable data storage system comprising:
a portable mass storage device having a static register and a common interface for connection to a computer system, said computer system providing normal operating power to the portable mass storage device via said common interface, said static register containing a value reflecting parameters defining one or more communication links established during initialization between the host computer and the portable memory drive;
an energy storage device in electrical communication with said static register such that said static register will retain a last stored value throughout a transient disconnection of said common interface; and
a computer program stored on a storage media for execution by said computer system such that upon reconnection of said common interface after said transient disconnection, the said computer program automatically rebuilds the one or more communication links using said last stored value thereby allowing resumption of communication with said portable mass storage device.

2. The portable data storage system of claim 1, wherein upon detecting a transient disconnection, said computer program provides a warning notification wherein said computer operator is prompted to reconnect said mass storage device.

3. The portable data storage system of claim 1, wherein said common interface comprises a universal serial bus.

4. The portable data storage system of claim 1, wherein said common interface comprises an IEEE-1394 bus.

5. The portable data storage system of claim 1, wherein said computer system includes memory and a copy of data written to said portable mass storage device is also concurrently written to said memory on a continuous basis.

6. The portable data storage system of claim 5, wherein said memory comprises random access memory.

7. The portable data storage system of claim 5, wherein said memory comprises a hard disk.

8. The portable data storage system of claim 5, wherein said computer program is configured to compare the data stored in said portable mass storage device with the data stored in said memory and to copy data from said memory to said mass storage device to correct any differences.

9. A connection error recovery system comprising:
an external computer device having a static register, said external computer device having common interface for connection to a computer system, said static register storing parameters or settings defining a communication link between the external computer device and the computer system;
an energy storage device in electrical communication with said static register such that said static register will retain a last stored value throughout a transient disconnection of said common interface; and
a computer program stored on a storage media for execution by said computer system such that upon reconnection of said common interface after said transient disconnection, the external computer device will use the parameters of settings stored in said static register to re-establish the communication link and thereby resume normal operation without the intervention of a computer operator.

* * * * *